(12) United States Patent
Lee

(10) Patent No.: US 7,255,826 B2
(45) Date of Patent: Aug. 14, 2007

(54) CONTAINER WITH A FOLDABLE PORTION AND METHOD FOR MANUFACTURING THE SAME

(76) Inventor: Jung-Min Lee, #1208 Misung Apt. A-dong, 37 Yeoueudo-dong, Youngdunpo-gu, Seoul (KR) 150-010

( * ) Notice: Subject to any disclaimer, the term of this patent is extended or adjusted under 35 U.S.C. 154(b) by 289 days.

(21) Appl. No.: 10/972,545

(22) Filed: Oct. 25, 2004

(65) Prior Publication Data
US 2005/0104262 A1    May 19, 2005

Related U.S. Application Data

(62) Division of application No. 10/451,557, filed as application No. PCT/KR01/02083 on Dec. 3, 2001, now abandoned.

(30) Foreign Application Priority Data

Jan. 4, 2001   (KR) .............................. 2001-01957
May 28, 2001   (KR) .............................. 2001-30637

(51) Int. Cl.
*B29C 49/06* (2006.01)
(52) U.S. Cl. ...................................... 264/506; 264/537
(58) Field of Classification Search ........ 264/505–508, 264/537
See application file for complete search history.

(56) References Cited

U.S. PATENT DOCUMENTS

| | | | |
|---|---|---|---|
| 3,185,353 A | 5/1965 | Mercier | 222/206 |
| 3,307,746 A | 3/1967 | Edwards | 222/143 |
| 3,326,421 A | 6/1967 | Peace | 222/143 |
| 3,493,146 A | 2/1970 | Conners et al. | 222/153.06 |
| 3,559,847 A | 2/1971 | Goodrich | 222/107 |
| 4,492,313 A * | 1/1985 | Touzani | 215/372 |
| 4,492,324 A | 1/1985 | Weber | 222/529 |
| 4,572,412 A | 2/1986 | Brach et al. | 222/527 |
| 4,979,628 A * | 12/1990 | Robbins, III | 215/395 |
| 5,624,062 A | 4/1997 | Pedersen et al. | 222/528 |
| 5,647,516 A | 7/1997 | Young et al. | 222/529 |
| 5,951,938 A * | 9/1999 | Takeuchi et al. | 264/520 |

FOREIGN PATENT DOCUMENTS

| | | |
|---|---|---|
| EP | 0 133 983 | 3/1985 |
| JP | 54-78287 A | 6/1979 |
| JP | 58-167012 U | 11/1983 |
| JP | 3-93410 U | 9/1991 |

* cited by examiner

*Primary Examiner*—Suzanne E. McDowell
(74) *Attorney, Agent, or Firm*—Norris McLaughlin & Marcus PA

(57) ABSTRACT

The invention relates to a container which is formed at the upper portion of the main body with the foldable portion having folding lines for easily folding the foldable portion. Processes for forming the container include a first step for forming a perform by injection molding and a second step for forming the finished product having the foldable portion by blow molding.

4 Claims, 6 Drawing Sheets

CONTAINER WITH A FOLDABLE PORTION AND METHOD FOR MANUFACTURING THE SAME

This application is a divisional of U.S. application Ser. No. 10/451,557, filed on Jun. 23, 2003, now abandoned, which is a 371 of PCT/KR01/02083, filed on Dec. 3, 2001.

TECHNICAL FIELD

The present invention relates to a container designed such that a foldable portion is forwardly formed with folding lines from a folding base line, or is formed with a bellows thereby being folded in a predetermined angle.

As the container with the foldable portion can be folded in a predetermined angle in use, the contents of the container can be stably dispensed.

Also, when the container with the foldable portion is coupled with a cap integrated with a straw, the user can suck the content of the container through the straw in state of bending the foldable portion in an angle that he wants.

BACKGROUND ART

Generally, container spouts could not be folded in so that the user inclined the container to drink the contents of the container.

U.S. Pat. No. 4,492,324 discloses a container with a bellows shaped foldable portion, but it is difficult to mold the bellows shaped foldable portion so that it cannot be in use commonly.

Further, it is a problem that when the inner pressure is applied to the container, the foldable portion is unfolded.

DISCLOSURE OF INVENTION

Therefore, the present invention has been made in an effort to solve the problem. It is an object of the present invention to provide a container designed such that the spout of the container can be flexed in a predetermined angle and the container can maintain the original shape thereof though the inner pressure is produced in the container.

Further, it is another object of the present invention to provide a container that can be easily produced through the injection blow molding process.

To achieve the above objects, the present invention provides a container comprising a spout in which a cap is coupled and a foldable portion which is formed below the spout and makes it possible the spout to be folded or unfolded.

Further, the present invention provides a container with a foldable portion and a method for manufacturing the same which is produced from a perform designed such that it includes a various shape and size of the spout which is formed above an annular band to be coupled with a closure, a main body formed below the annular band to be blown into a bottle and a thin portion for folding formed between the annular band and main body to be blown into the foldable portion.

BRIEF DESCRIPTION OF DRAWINGS

The accompanying drawings, which are incorporated in and constitute a part of the specification, illustrate an embodiment of the invention, and, together with the description; serve to explain the principles of the invention:

FIGS. 4 to 7 show a second embodiment of the present invention in which; FIG. 4 is a perspective view, FIG. 5 is a sectional view of a preform, and FIGS. 6 and 7 show a container with a cap in use.

BEST MODE FOR CARRYING OUT THE INVENTION

A preferred embodiment of the present invention will be described in detail with reference to the accompanying drawings.

First Embodiment

Figure 1:
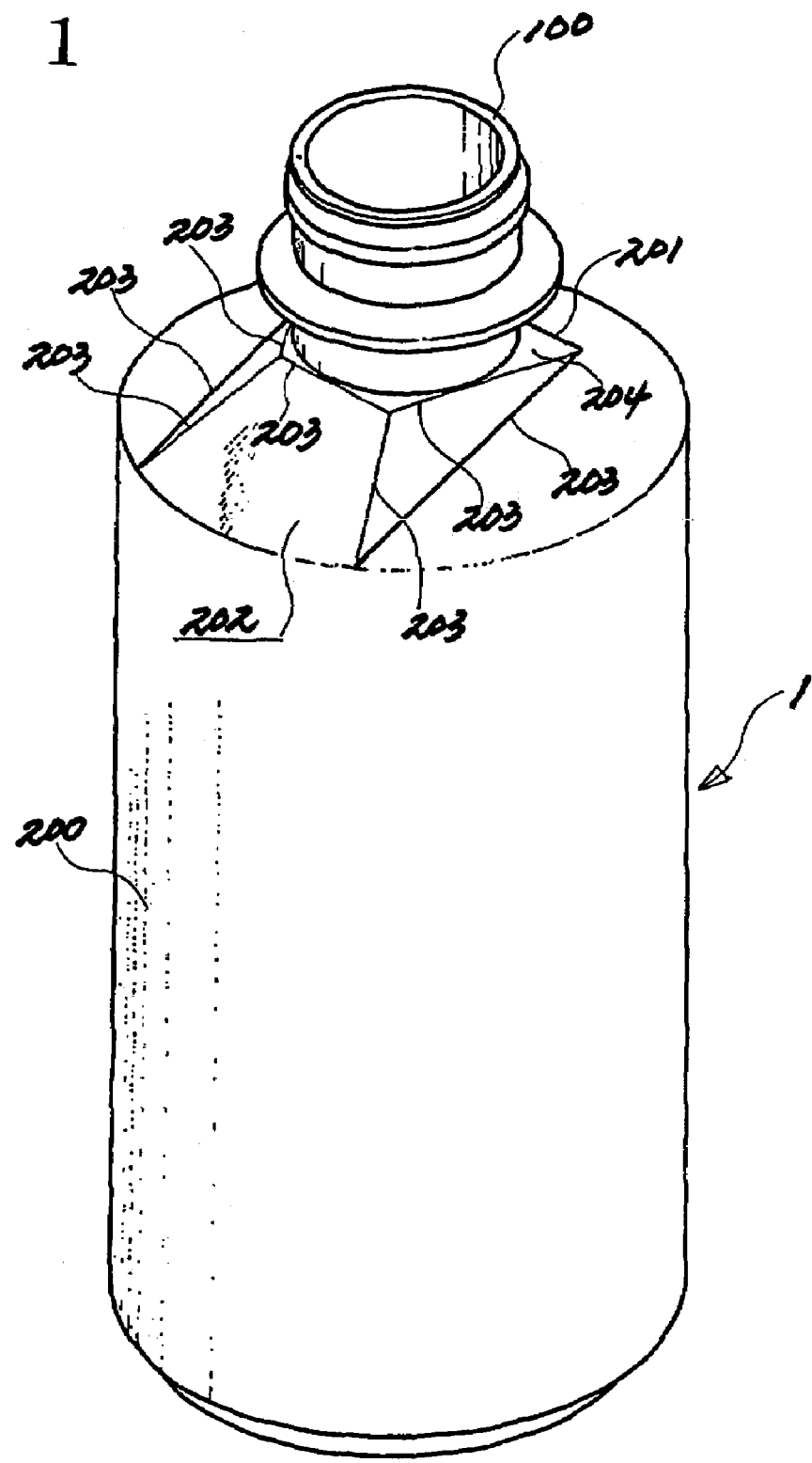
FIG. 1 is a perspective view of a container with a foldable portion in a first embodiment according to the present invention.
Figure 2:
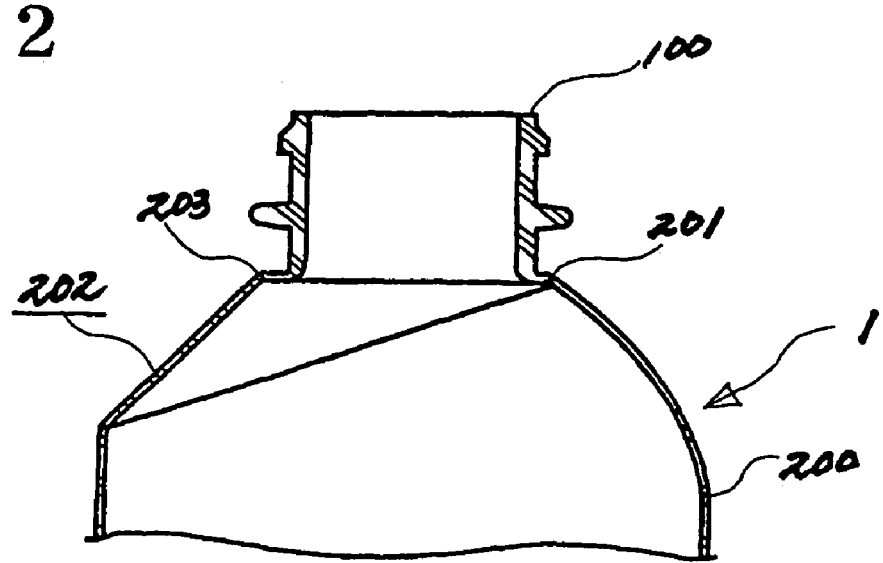
FIG. 2 is a sectional view of a container with a foldable portion in a first embodiment according to the present invention.
Figure 3:
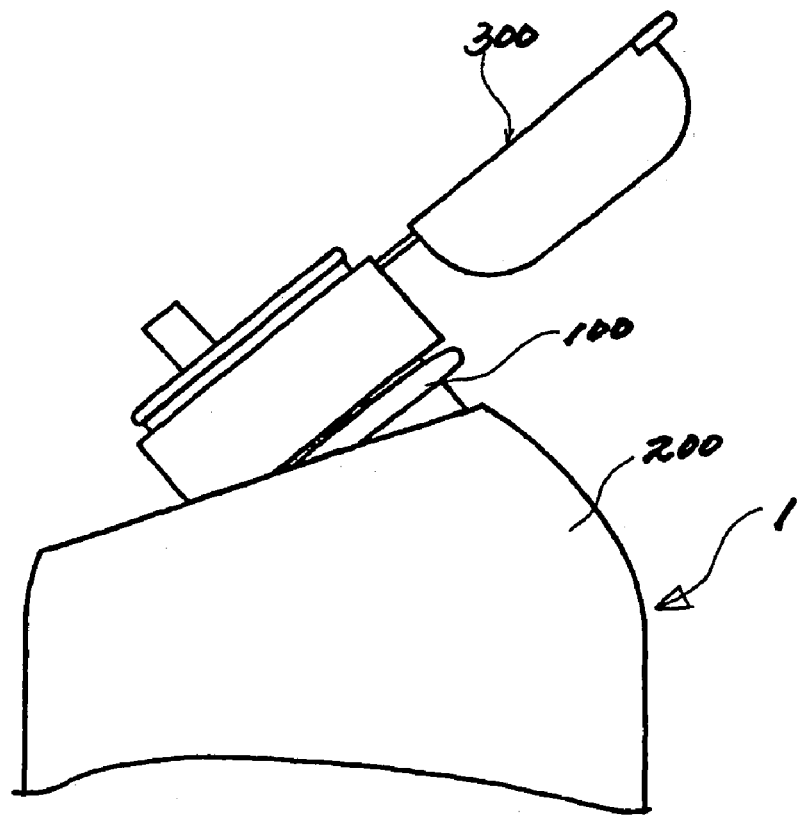
FIG. 3 shows a container coupled with a cap in a first embodiment according to the present invention.

FIGS. 1 to 3 show a container with a foldable portion a first embodiment according to the present invention.

As shown in Figures, a container 1 comprises a spout 100 and a main body 200 in which the spout 100 can be coupled with a cap in one-touch or screw closing manner.

Further, a foldable portion 202 is forwardly formed from a folding base line 201 as if the foldable portion 202 hugs the spout 100 centering around the folding base line 201, and the foldable portion 202 includes folding lines 203 in order to be easily folded in.

Preferably, the folding lines 203 make a relatively plane upper surface 204 of the foldable portion 202 at the front of the folding base line 201, the upper surface 204 is formed with the folding lines 203 at both sides thereof centering around the folding base line 201, and the ends of those folding lines 203 meet a folding line 203 parallel to the folding base line 201.

Further, the length of the folding line 203 formed at the front of the folding base line 201 is shorter than that of the folding base line 201.

The folding lines 203 downward widened are formed at each end of the folding line 203 met with the folding lines 203 formed at both ends of the upper surface 204 of the foldable portion 202.

Preferably, the foldable portion 202 is shaped at its both sides of faced two triangles and between the triangles, is shaped of two trapezoids protrudently met each other.

This is, the folding angle of the spout 100 is decided according to the size of the triangles and trapezoids.

The operation of the present invention is described in detail below.

If the user pushes or pulls the spout 100 toward the foldable portion 200, the foldable portion turns over and the spout 100 is folded in a predetermined angle. At this point, the spout 100 maintains the folded shape until an outer force is applied thereto, and when the user applies a force to the spout 100 in order to unfold it, the spout 100 can be reverted to its original shape.

FIG. 3 shows the container with the foldable portion in which the spout 100 with the cap 300 is folded in.

Further, in FIGS. 1 and 2, although the contents contained in the containers 1 of the present invention is a carbonated beverage, the container 1 does not easily deform. This is because the foldable portion 202 is protruded from a side of the container 1.

Second Embodiment

FIGS. 4 to 7 show another embodiment of the present invention.

An injection molded preform 400 is designed such that it includes a various shape and size of a spout 402 which is formed above an annular band 401 to be coupled with a closure, a main body 403 formed below the annular band 401 to be blown into a bottle and a thin portion 404 for folding formed between the annular band 401 and main body 403 to be blown into the foldable portion.

Now, the detailed description of the present invention will described below.

Figure 5:
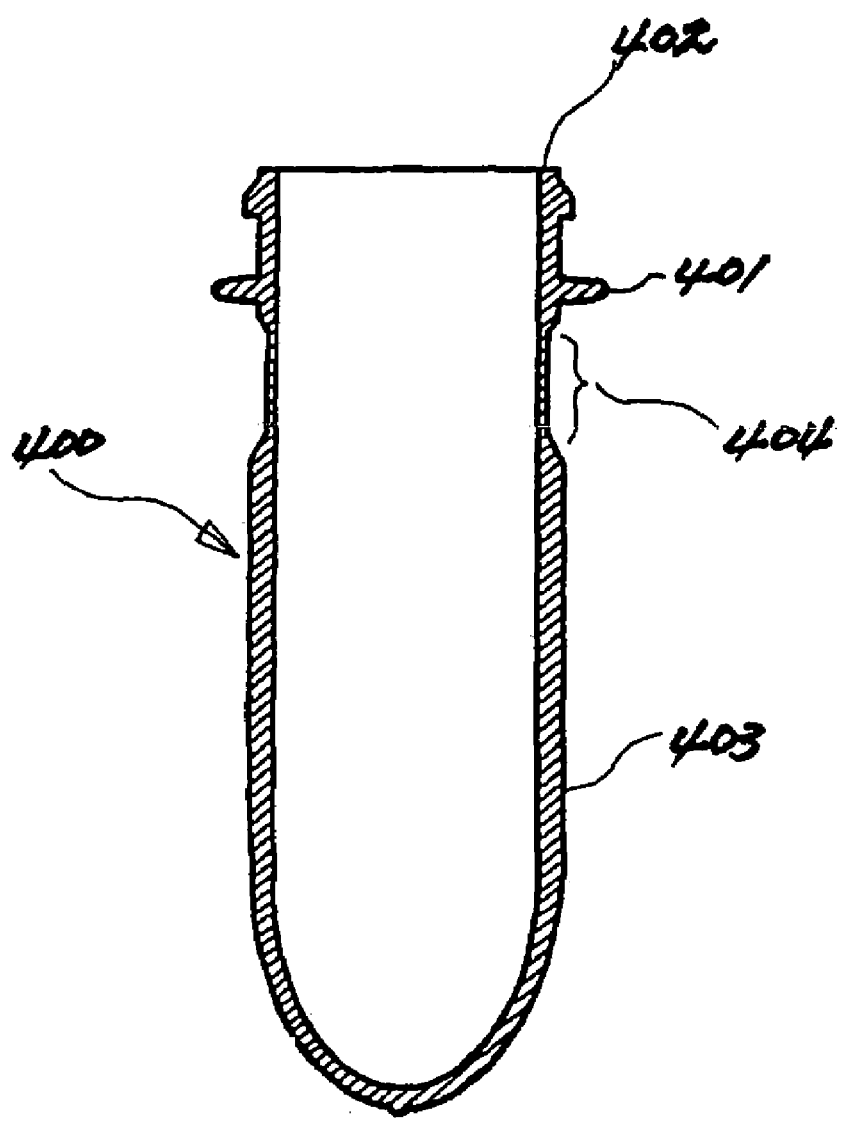

The preform 400, as shown in FIG. 5, is blown into a predetermined shape of a bottle and at the same time, the thin portion 404 for folding is blown into a bellows shaped foldable portion 202'.

Figure 4:
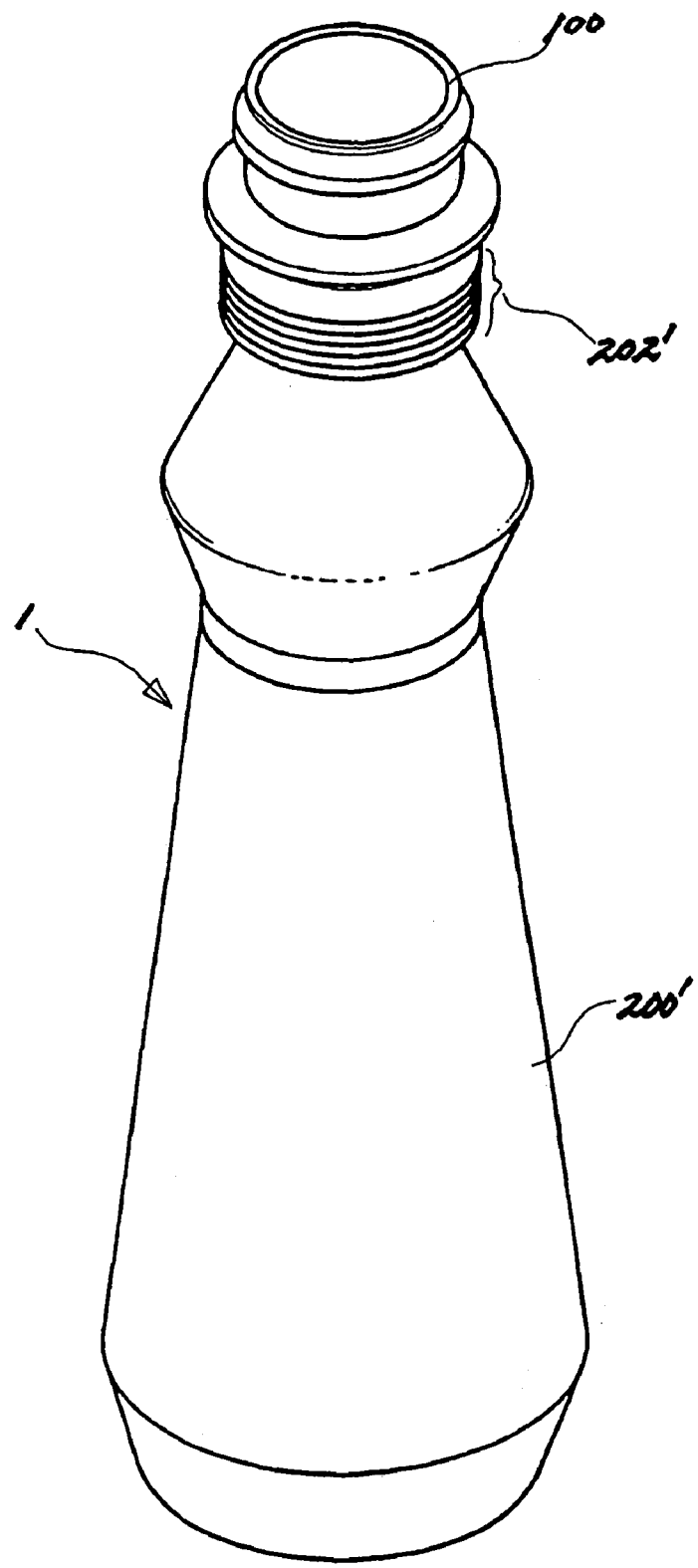

FIG. 4 shows the foldable portion 202' that is folded in.

Figure 6:
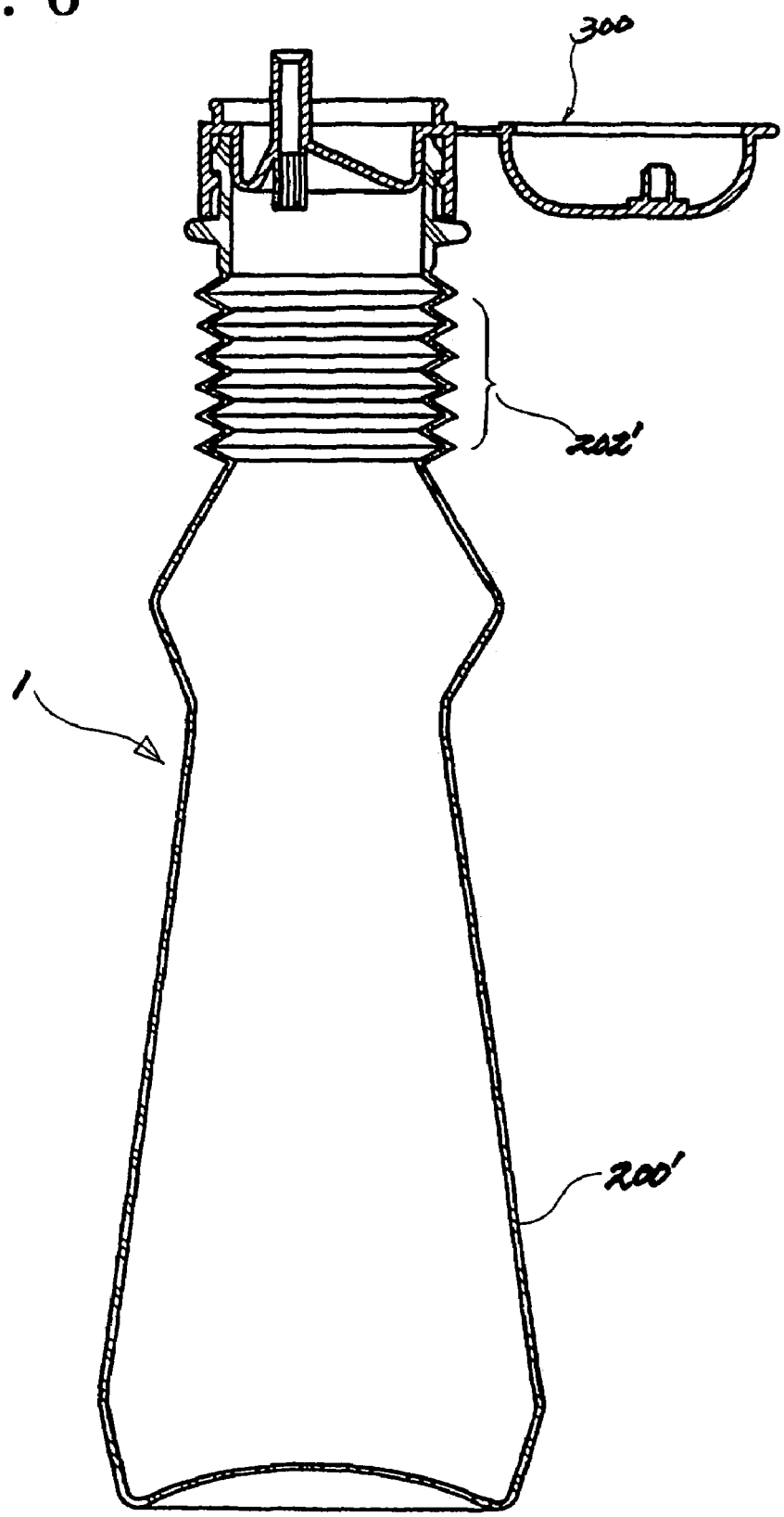
Figure 7:
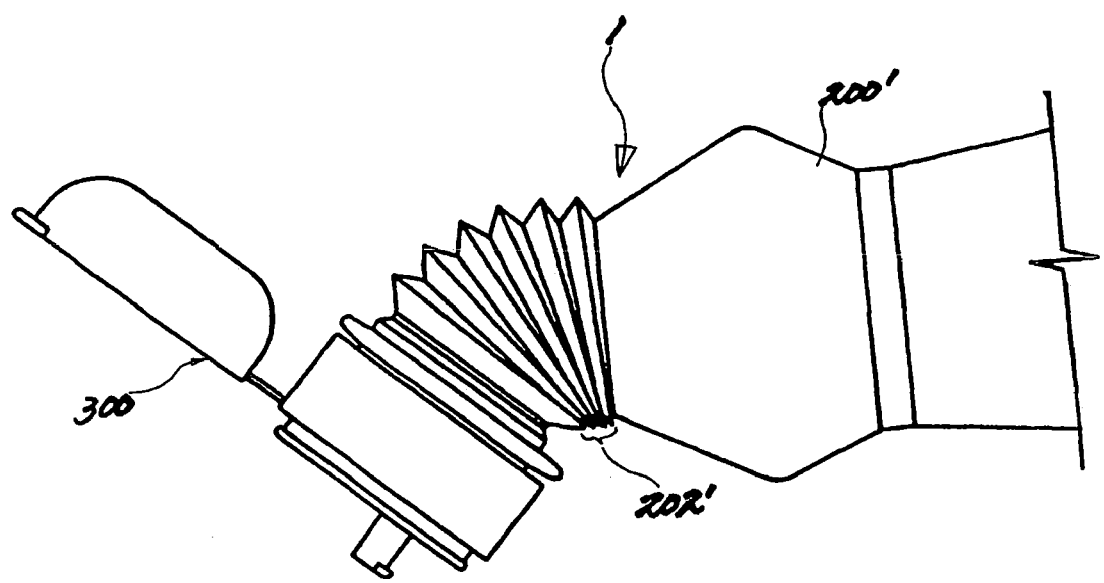

FIG. 6 shows the container 1 with the cap 300 in which the foldable portion 202' of the spout 100 is unfolded, and FIG. 7 shows the container 1 in use.

The foldable portion 202' can be folded to be overlapped. Preferably, the thin portion 404 for folding of the preform 406 is molded thinner than that of the preform main body 403.

While this invention has been described in connection with what is presently considered to be the most practical and referred embodiments, it is to be understood that the invention is not limited to the disclosed embodiments, but, on the contrary, is intended to cover various modifications and equivalent arrangements included within the spirit and scope of the appended claims.

The invention claimed is:

1. A method for making a container with a foldable portion, said method comprising the steps of:

(a) preparing an injection molded preform, said preform comprising, a main body, an annular band formed above the main body, and a thin portion formed between the annular band and the main body; and (b) blowing the preform into a predetermined shape of a container, wherein the thin portion forms a foldable portion of the container.

2. The method of claim 1, wherein the perform is blown into a predetermined shape of a container and the thin portion for folding is blown into a bellows shaped foldable portion.

3. The method of claim 2, wherein the foldable portion can be folded to be overlapped.

4. The method of claim 1, wherein the thin portion the preform is molded thinner than that of the preform main body.

* * * * *